United States Patent [19]

Tourunen

[11] 4,044,865
[45] Aug. 30, 1977

[54] HYDRAULIC SHOCK ABSORBER

[75] Inventor: Pekka Tapio Tourunen, Sodertalje, Sweden

[73] Assignee: AB Mecman, Alvsjo, Sweden

[21] Appl. No.: 690,044

[22] Filed: May 25, 1976

[51] Int. Cl.² .............................................. F16F 9/44
[52] U.S. Cl. .................................... 188/287; 188/315
[58] Field of Search ............................. 188/285-287, 188/299, 315, 322; 267/34

[56] References Cited

U.S. PATENT DOCUMENTS

| | | | |
|---|---|---|---|
| 3,168,168 | 2/1965 | Chorkey | 188/287 |
| 3,510,117 | 5/1970 | Scholin et al. | 188/287 X |
| 3,598,206 | 8/1971 | Hennells | 188/287 |
| 3,666,256 | 5/1972 | Ellis et al. | 188/315 X |
| 3,693,767 | 9/1972 | Johnson | 188/287 X |

*Primary Examiner*—Duane A. Reger
*Attorney, Agent, or Firm*—Wenderoth, Lind & Ponack

[57] ABSTRACT

A hydraulic shock absorber includes a cylinder, a piston therein, a sleeve surrounding the cylinder wall and provided with an internal thread, the crest of which engages the cylinder wall, possibly a storage chamber for liquid provided outside the cylinder and connected to the slot of the thread, at least one cylinder chamber in communication with the slot of the thread through at least one narrow opening which may be throttled more or less by the crest of the thread, when the cylinder and the sleeve are rotated mutually.

3 Claims, 1 Drawing Figure

U.S. Patent     Aug. 30, 1977     4,044,865
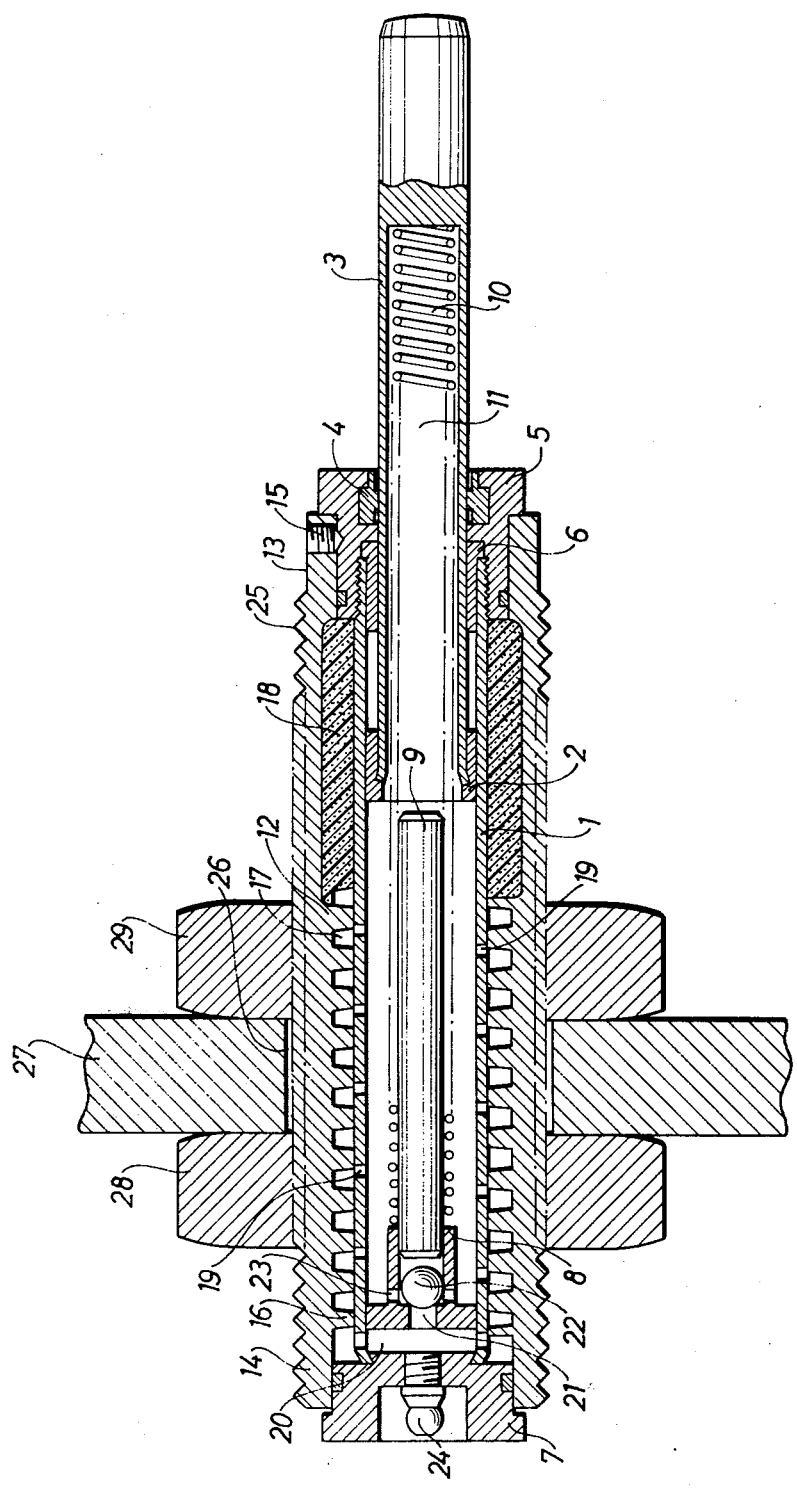

HYDRAULIC SHOCK ABSORBER

BACKGROUND OF THE INVENTION

The invention relates to a hydraulic shock absorber of the type which comprises a cylinder with a movable piston therein, at least one cylinder chamber in communication with a liquid receptacle outside the cylinder through at least one rather narrow opening in the cylinder wall, such opening serving to damp the movement of the piston due to its resistance against the outflow of the liquid enclosed in the cylinder chamber in question. Shock absorbers of this kind are especially useful for damping the movements of machine members and heavy workpieces within various industrial plants, such as rolling mills, for instance, but also other ranges of application are altogether possible.

SUMMARY OF THE INVENTION

The object of the invention is to make possible a simple and rapid change of the damping power of a shock absorber, as such a change has recently proved to be highly desirable. For that purpose, the wall of the cylinder is enclosed in a sleeve having an internal thread, the slot of which constitutes at least a part of the receptacle for liquid, while the crest of the thread engages the outside of the cylinder wall. Thus, a change of the damping power may be obtained by rotating the sleeve and the cylinder in relation to each other, so that the crest of the thread will more or less cover the narrow opening for the flow of liquid.

BRIEF DESCRIPTION OF THE DRAWING

The invention will be further described hereinafter with reference to the enclosed drawing which shows an axial section through a single-acting hydraulic shock absorber, in which the liquid (oil) is in the known way forced out into a receptacle during the damping stroke.

DETAILED DESCRIPTION OF THE INVENTION

In the drawing, 1 designates the cylindrical wall of a cylinder containing a piston 2, from which a piston rod 3 projects through one end of the cylinder. Thus, the piston rod passes through a sealing ring 4 which is inserted in an opening in the end wall 5 of the cylinder. End wall 5 is cup-shaped and has an internal thread screwed on an external thread on the cylinder end. Further, the piston rod 3 is guided in a bushing 6 which is firmly held between the end wall 5 and the end of the cylinder 1.

The opposite end of the cylinder 1 is closed by an end wall 7 formed at its inside with a short pipe 8 which projects axially into the cylinder. This pipe 8 has for its purpose to hold one end of a rod 9 which extends axially inwardly over about two-third of the inner length of the cylinder to serve as a guide for a return spring 10. One end of spring 10 rests against the end surface of the pipe 8, while the opposite end of the spring engages the bottom of an elongated axial boring 11 which is made in the piston rod 3 from its inner end.

The cylinder wall 1 is enclosed in a sleeve 12. The end portions 13, 14 of the sleeve, which internally are smooth and cylindrical, are rotatably journalled on corresponding cylindrical portions of the two end walls 5 and 7, respectively. The sleeve end portion 13 journalled on the wall 5 contains a threaded bore for a locking screw 15 which is adapted to be tightened onto the wall 5. Internally, the sleeve 12 is formed with a trapezoid thread which extends from the sleeve end portion 14. The crest 16 of this thread engages the cylinder wall with a close fit, and the slot 17 of the thread communicates with an annular chamber 18 which has been formed by turning out the inside of the sleeve 12 along a section adjacent to the sleeve end portion 13. In the embodiment shown, the chamber 18 is filled with cellular plastic having closed cells filled with gas, but it may also be possible to insert an annular piston spring-loaded in the direction onto the slot 17 of the thread.

Along the thread 16 of the cylinder wall 1 is provided with a number of holes 19, through which the cylinder chamber inside of the piston 2 may be caused to communicate more or less with the slot 17 of the thread. In the embodiment shown, the cylinder wall has two longitudinal rows of holes 19 provided diametrically opposite each other, but otherwise the holes 19 may also be placed unsymmetrically axially as well as peripherically for obtaining some particular damping characteristic.

The end wall 7 contains a transverse channel 20 which communicates with the adjacent end of the thread slot 17 through corresponding holes in the wall of cylinder 1. A short axial channel 21 connects the channel 20 to a valve housing formed in the pipe 8 inside of the end of the rod 9. This valve housing contains a ball 22 which cooperates with the mouth of the channel 20 to serve as a nonreturn valve member. Further, holes 23 in the pipe 8 connect the valve housing with the surrounding cylinder chamber. A threaded filling nipple 24 is screwed into a threaded hole which extends from the outside of the wall 7 to the channel 20.

To facilitate the mounting of the shock absorber the sleeve 12 may have an external thread 25 which extends at least a distance from one end of the sleeve, preferably along the whole sleeve. In the drawing, the shock absorber is mounted in a hole 26 in a wall 27 by means of nuts 28, 29 which have been screwed on the thread 25 and tightened against the sides of the wall 27.

In the drawing, the shock absorber is shown in its inoperative state, where the spring 10 has moved the piston rod 3 and the piston 2 to an outermost position to the right in the figure. The cylinder chamber inside the piston 2, the thread slot 17 in the sleeve 12, the valve housing in the pipe 8 as well as channels 20, 21 etc. are assumed to be filled with oil or another liquid. If now the piston rod 3 is acted upon to move the piston 2 inwardly, the ball valve 22 will immediately close due to the increased pressure in the cylinder chamber, and the oil is then forced out into the thread slot 17 through the holes 19 which are more or less throttled by the crests of the thread 16. Thus, the oil flows through the slot 17 into the storage chamber 18, where the cushion of cellular plastic will be correspondingly compressed.

When the load acting on the end of the piston rod 3 ceases, the piston 2 and its rod are returned to the starting position by the influence of the spring 10, and at the same time the ball valve 22 is opened, so that the return flow of oil into the now growing cylinder chamber is facilitated, and thus the return stroke is accelerated.

When a change of the damping power or capacity is desired, the locking screw 15 is loosened, and the cylinder 1 is rotated within the sleeve 12 which is here held immovable. At this rotation the crest 16 of the thread is thus caused to cover smaller or larger portions of the cross-section areas of the holes 19. To facilitate the rotation of the cylinder the outer portion of the end wall

5 may be formed as a hexagonal nut, or it may have holes for a wrench. Further, the end surface of the sleeve 12 may be provided with a graduated scale, if desired.

In case a double-acting shock absorber is desired, both the cylinder chambers are, of course, filled with liquid, and they are also both connected to the thread slot 17 through holes in the cylinder wall. No storage chamber for the liquid is here required, since, on the movement of the piston, liquid is transferred from one cylinder chamber to the other.

What I claim is:

1. A hydraulic shock absorber comprising a cylinder, a movable piston within said cylinder, a liquid receptacle outside the cylinder, at least one cylinder chamber within said cylinder and in communication with said receptacle through at least one narrow opening in the wall of said cylinder, said opening serving to damp the movement of the piston due to its resistance against the outflow of the liquid from the cylinder chamber, a sleeve enclosing said cylinder and having an internal thread having a slot which constitutes at least a part of said liquid receptacle, said thread having a crest which engages the cylinder wall, whereby a change of the damping power is obtained by rotating the sleeve and the cylinder in relation to each other, so that the crest of the thread will more or less cover the cross-section area of the opening for the flow of liquid.

2. A shock absorber as claimed in claim 1, wherein the internal thread of the sleeve is a trapezodal thread.

3. A shock absorber as claimed in claim 1, wherein said cylinder chamber is also connected to the slot of the thread within the sleeve by means of a nonreturn valve opening onto said cylinder chamber.

* * * * *